United States Patent
Tanner et al.

(10) Patent No.: US 7,823,069 B1
(45) Date of Patent: Oct. 26, 2010

(54) METHOD AND APPLICATION TOOL FOR DYNAMICALLY NAVIGATING A USER CUSTOMIZABLE REPRESENTATION OF A NETWORK DEVICE CONFIGURATION

(75) Inventors: David Anthony Tanner, Saratoga, CA (US); Christopher Norris, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 544 days.

(21) Appl. No.: 11/388,679

(22) Filed: Mar. 23, 2006

(51) Int. Cl.
*G06F 3/00* (2006.01)

(52) U.S. Cl. .................. 715/745; 715/735; 715/736; 715/738; 715/744; 715/788

(58) Field of Classification Search .............. 715/735, 715/736, 738, 744, 745, 788
See application file for complete search history.

(56) References Cited

U.S. PATENT DOCUMENTS

| | | | | |
|---|---|---|---|---|
| 6,023,715 | A * | 2/2000 | Burkes et al. ............... | 715/207 |
| 6,760,761 | B1 * | 7/2004 | Sciacca ....................... | 709/220 |
| 6,772,204 | B1 * | 8/2004 | Hansen ....................... | 709/220 |
| 7,096,256 | B1 * | 8/2006 | Shafer ........................ | 709/220 |
| 2003/0046370 | A1 * | 3/2003 | Courtney .................... | 709/220 |
| 2004/0010755 | A1 * | 1/2004 | Hamada ...................... | 715/513 |
| 2005/0039164 | A1 * | 2/2005 | Cosimo et al. .............. | 717/110 |
| 2006/0015591 | A1 | 1/2006 | Datla et al. | |
| 2006/0036994 | A1 * | 2/2006 | Englefield et al. ........... | 717/104 |
| 2006/0143559 | A1 * | 6/2006 | Spielberg et al. ............ | 715/512 |
| 2007/0288256 | A1 * | 12/2007 | Speier .......................... | 705/1 |
| 2009/0228126 | A1 * | 9/2009 | Spielberg et al. ............. | 700/94 |

OTHER PUBLICATIONS

Econtrol Ltd., Econtrol Syntax Editor SSK, Published on the web at: http://www.econtrol.ru/syntedit_e.html, copyright 2004-2006 (20 pages).
Cisco Systems, Inc., Cisco Craft Works Interface User Interface Guide, Release 3.2, Table of Contents, and Chapter 3 (pp. 125-134) also available on the web at: http://www.cisco.com/en/US/products/ps5763/products_user_guide_list.html; Copyright 2005 (18 pages).

* cited by examiner

*Primary Examiner*—Sara England
*Assistant Examiner*—John Heffington
(74) *Attorney, Agent, or Firm*—Trellis IP Law Group, PC

(57) ABSTRACT

In one embodiment of the invention, a method and an application tool for dynamically representing configuration commands of a network device on a user interface are provided. According to the method, a data model is stored with the application tool. Thereafter, the configuration commands are rendered on to the data model and the rendered data model is represented on the user interface in real time.

26 Claims, 10 Drawing Sheets

METHOD AND APPLICATION TOOL FOR DYNAMICALLY NAVIGATING A USER CUSTOMIZABLE REPRESENTATION OF A NETWORK DEVICE CONFIGURATION

BACKGROUND OF THE INVENTION

1. Field of Invention

The present invention relates, in general, to network devices. More specifically, embodiments of the invention relate to methods and systems for customizing and dynamically navigating a representation of a network device configuration.

2. Description of the Background Art

Various network devices are required for communication across networks and are configured so that they can communicate with other network devices. The configuration is accomplished using a configuration that may include the addresses of the devices, protocols for communication, handling inbound and outbound traffic, and so forth.

Conventionally, the configuration may be modified with the help of a text interface. One such text interface in wide use is referred to such as a command line interface. A series of commands are entered line by line to the command line interface for this purpose. Because of the sheer size and complexity of the configuration it is often difficult to read and navigate, even if these configuration commands being modified are few in number.

Once a network device is deployed in a network, a network service provider is often tasked with handling the modification of the configuration for a large number of network devices. It is also very difficult for the service provider to understand the overall content, structure and relationship of these various configuration commands given the nuances of a complex network device. Further, with large, complex configurations, the task of identifying incomplete or inconsistent sections of the configuration becomes difficult.

It is also difficult to locate, navigate to or view desired portions of configuration commands in scattered portions of the configuration. While locating or navigating between portions of the configuration is difficult even with a relatively small number of commands or lines of code, it is especially burdensome for configuration s having tens of thousands of lines of code.

It is well recognized that modifying the configuration for a network device is slow and often prone to programming errors. Thus, a system and method for representing configuration commands of a network device that expedites the task of modifying (or simply viewing and navigating through) a configuration is clearly desirable.

DETAILED DESCRIPTION OF EMBODIMENTS OF THE INVENTION

Figure 1:
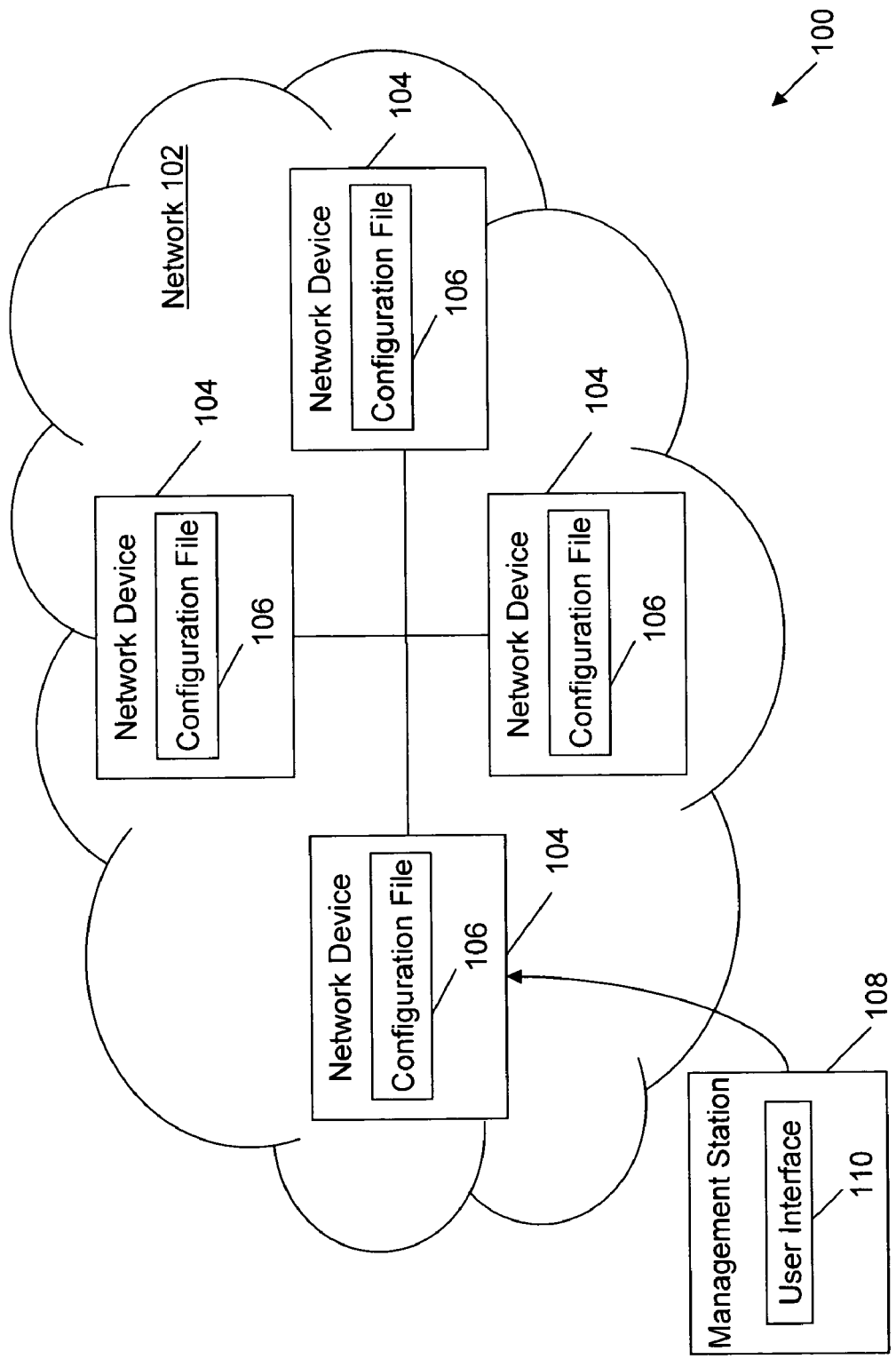
FIG. 1 illustrates an environment for implementing an embodiment of the invention.

The embodiments of the invention provide a method and an application tool for dynamically representing configuration commands of a network device on a user interface. In the description herein for embodiments of the present invention, numerous specific details have been provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or so forth. In other instances, well-known structures, materials, or operations are specifically not shown or described in detail to avoid obscuring aspects of embodiments of the present invention.

Computer networks comprise various network devices that must be configured to perform specific functions in networks. A configuration describes the physical configuration of the network and typically contains at least one line for each switch in the network. For large networks, the configuration will be very large, often comprising tens of thousands of lines of code information. Thus, navigating and understanding the configuration is difficult due to the sheer size of the configuration.

In accordance with the present invention, enhancements are overlaid on top of the text interface to allow users to dynamically customize their view of a device's configuration. The enhancements offer the user the ability to control how the view and navigate configurations to fit their individual needs.

In accordance with the present invention, an application tool stores a data model of the configuration for a network device. The configuration contains the configuration commands required for configuring the network device. The application tool renders the configuration commands based on the data model and a set of contextual linkage rules to generate a user interface that represents the configuration in a user-friendly manner. In one embodiment of the invention, the configuration is rendered such that related lines of code that may not be in a contiguous block are dynamically linked to each other by a contextual-linkage. This contextual-linkage is used to link and easily navigate between related configuration commands. A graphical pop-up box, representing a snapshot of the linked configuration command, is displayed next to the contextual-linkage so that the user does not have to physically scroll to the linked command.

In another embodiment of the invention, the configuration commands are rendered such that one or more nested configuration commands are either hidden or displayed on the user interface, based on the selection of an expand-collapse check indicator.

In yet another embodiment of the invention, the configuration commands are rendered such that all nested configuration commands are simultaneously either hidden or displayed on the user interface, based on the selection of an "all-blocks" expand-collapse check indicator.

In yet another embodiment of the invention, the configuration commands are rendered such that a mismatch in a block of configuration commands is dynamically identified and displayed on the user interface to assist in correcting programming errors.

Referring now to the drawings, particularly by the respective reference numbers, FIG. 1 illustrates an environment 100 for implementing an embodiment of the invention. Environment 100 includes a network 102. Examples of network 102 include, but are not limited to, the Internet, a Local Area Network (LAN), a Wide Area Network (WAN), a Virtual Private Network (VPN), a client server network, and a peer-to-peer network. Network 102 comprises a plurality of network devices 104. Network devices 104 are connected in a manner that enables the transfer of data from one network device 104 to another across network 102. Examples of network devices 104 include, but are not limited to, gateways, routers, bridges, switches, hubs, and repeaters. Network devices 104 possess a large number of features related to, by way of illustration, protocol implementation, setting the method for authentication, setting the method for allowing selective access to different users, and so forth. These features as well as the manner in which the network device 104 will function are determined by the commands contained in a configuration 106 associated with each network device 104.

A management station 108 is used to generate a set of commands, known as the configuration commands, for configuring network device 104 using a text interface. Management station 108 comprises a user interface 110 for generating the configuration commands. These configuration commands are transferred on to network device 104 to replace, for example, a pre-existing configuration with a modified configuration. Modifications in configuration 106 are carried out after transferring configuration 106 from a selected one of the network devices 104 to management station 108. Thereafter, the modified configuration commands are loaded on to network device 104. In an alternative embodiment of the invention, modification of configuration 106 is carried out directly on network device 104 without the need to transfer configuration 106 to the management station 108.

Figure 2:
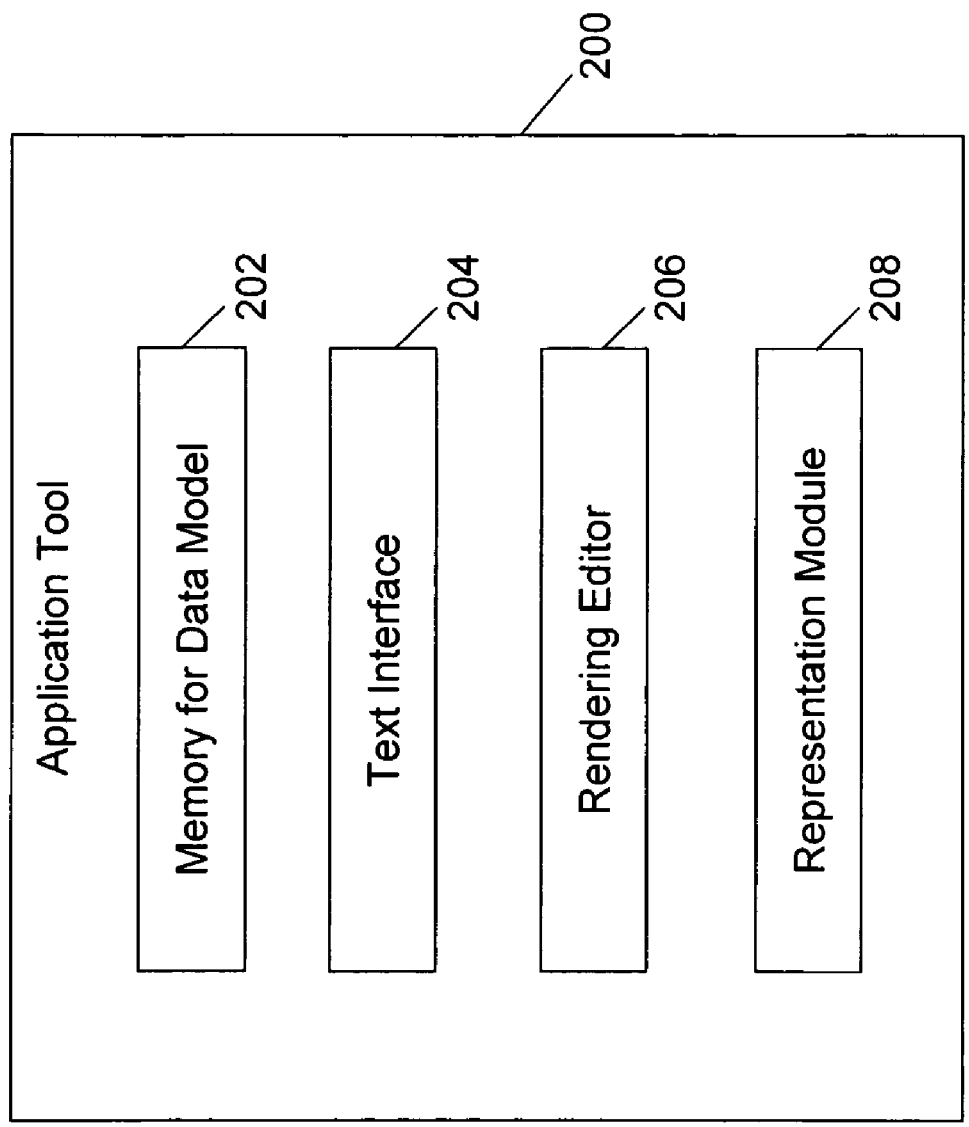
FIG. 2 illustrates a block diagram of an application tool for dynamically representing configuration commands of a network device on a user interface, in accordance with an embodiment of the invention.

FIG. 2 illustrates a block diagram of an application tool 200 for dynamically representing configuration commands of network device 104 on user interface 110, in accordance with an embodiment of the invention. Application tool 200 preferably executes on management station 108 and comprises memory 202 for storing the configuration 106, a text interface 204 for modifying command lines in configuration s 106, rendering editor 206 and a representation module 208. Memory 202 stores a data model of the configuration commands. Examples of memory 202 includes, but are not limited to, a cache memory, a flash memory, a hard disc, a floppy disc, and an optical memory. The data model comprises the meaning of each configuration commands. In addition, the data model includes the relationships between the various configuration commands. The text interface 204 is used to modify the data model.

Rendering editor 206 interfaces with text interface 204 to render the configuration commands on the data model. Rendering, in this case, refers to parsing one or more configuration commands, based on the data model. For example, rendering implies watching out for errors in the configuration commands. In addition, rendering editor 206 dynamically carries out this rendering. Therefore, if any modifications are carried out on the configuration commands, rendering editor 206 dynamically renders the modifications on the data model so that the results of the modifications are provided on user interface 110 in real-time.

Representation module 208 represents the data model on user interface 108. In addition, representation module 208 handles user interactions. For example, if the user modifies one or more configuration commands, the representation module 208 dynamically provides the information regarding the modifications to rendering editor 206. Additionally, representation module 208 represents the results of these modifications in the data model on user interface 108.

Figure 3:
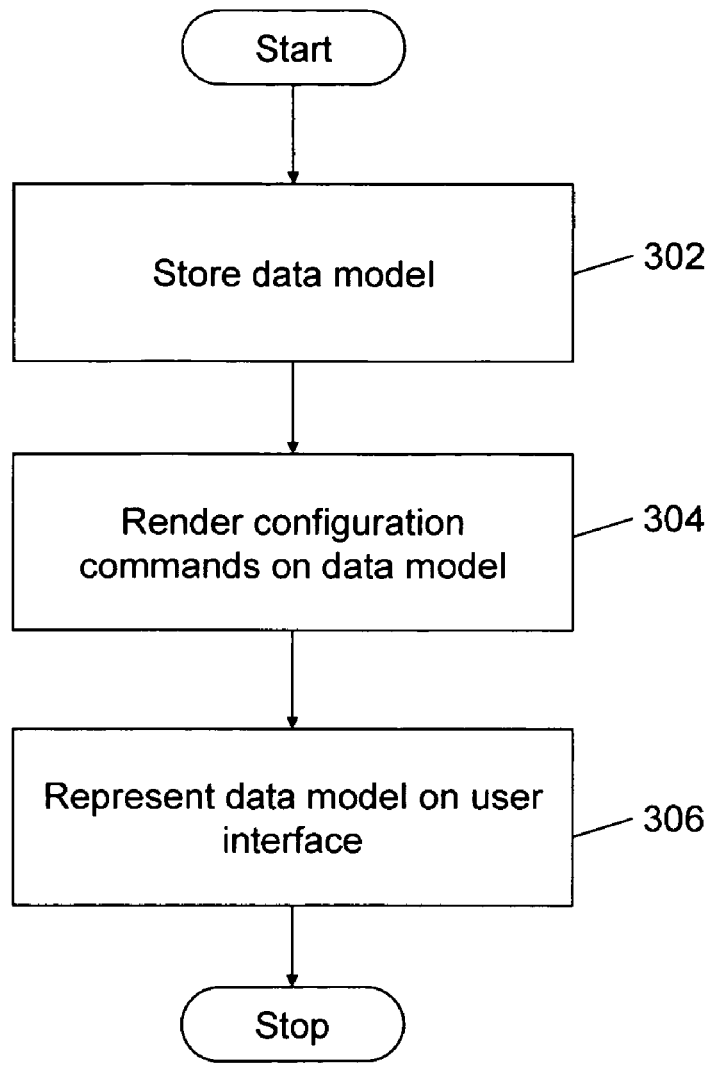
FIG. 3 illustrates a flowchart of a method for dynamically representing configuration commands of a network device on a user interface, in accordance with an embodiment of the invention.

FIG. 3 illustrates a flowchart of a method for dynamically representing configuration commands of network device 104 on user interface 108, in accordance with an embodiment of the invention. Application tool 200 acquires a data model and configuration commands from network device 104. At 302, the data model is stored in memory 202, which also stores the configuration commands that have been added, deleted or modified on user interface 108. Thereafter, at 304, the configuration commands are rendered on the data model. Rendering comprises parsing of one or more commands from the configuration commands. In an embodiment, rendering comprises searching for errors in the configuration commands. At 306, the data model is represented on user interface 108 by representation module 208. Representation module 208 indicates the presence or absence of one or more configuration commands on user interface 108. Additionally, representation module 208 indicates the presence of error on user interface 108.

Figure 4:
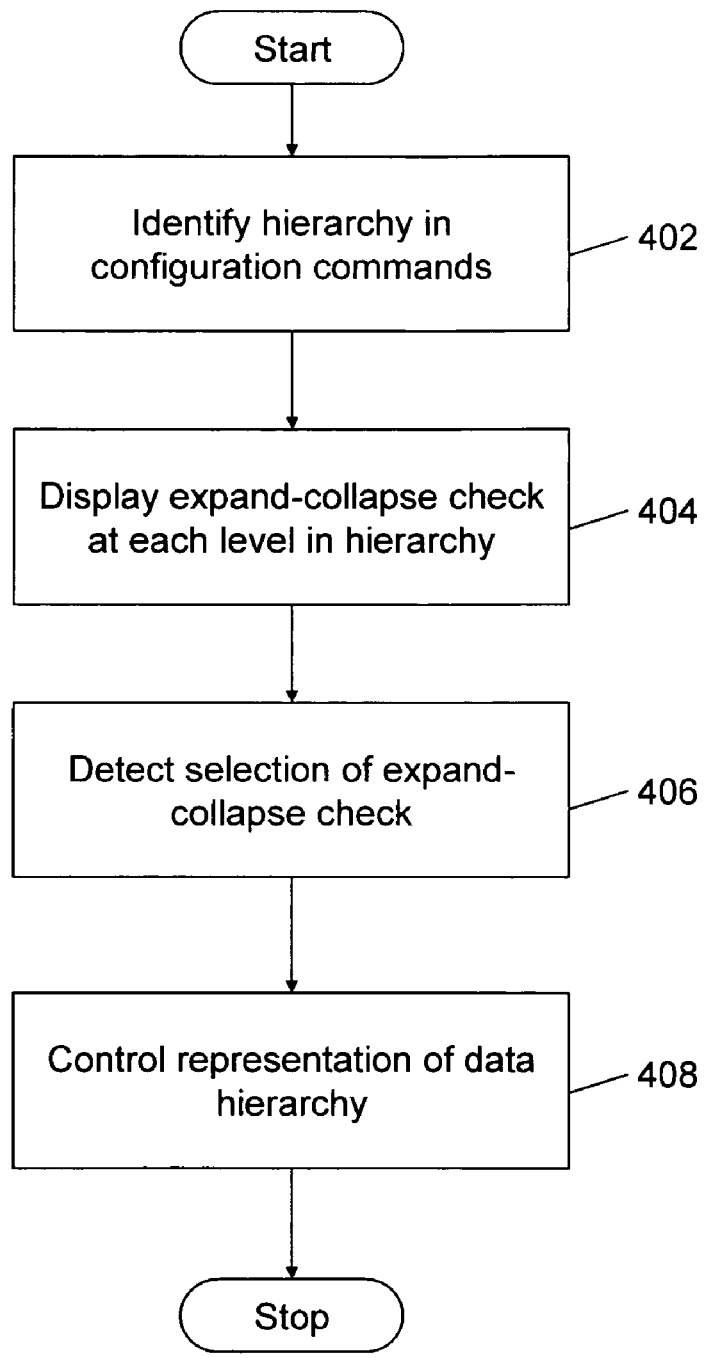
FIG. 4 illustrates a flowchart of a method for dynamically representing configuration commands of a network device on a user interface with the help of an expand-collapse check indicator, in accordance with another embodiment of the invention.

FIG. 4 illustrates a flowchart of a method for dynamically representing configuration commands of network device 104 on user interface 108 with the help of an expand-collapse check indicator, in accordance with another embodiment of the invention. Typically, the configuration comprises a hierarchy of configuration commands represented by indents.

At 402, the hierarchical structure is identified in the data model by rendering editor 206. At 404, representation module 208 can display an expand-collapse check indicator for each level in the hierarchical structure. At 406, representation module 208 detects that the expand-collapse check indicator has been selected. At 408, representation module 208 controls the representation of the data hierarchy. In this case, the representation is controlled by dynamically collapsing the configuration commands, such that all configuration commands lower in the hierarchy are not visible on user interface 108. Although these commands are not visible on user interface 108, these commands exist in data model. Therefore, viewing features, such as find and replace, can be used for these commands even when these commands are not visible.

When representation module 208 detects a re-selection of the expand-collapse check indicator, the collapsed commands are dynamically expanded by representation module 208. Thereafter, the collapsed commands are visible on user interface 108. In this manner, a user can quickly scan a collapsed view of a large configuration to locate relevant portions that require modification. Once the relevant portion is located, the portion can be expanded to show the hierarchical view of the commands. Furthermore, with any addition, deletion or modification to the hierarchy, the expand-collapse check indicators are changed dynamically by rendering editor 206 and dynamically represented by representation module 208.

Figure 5A:
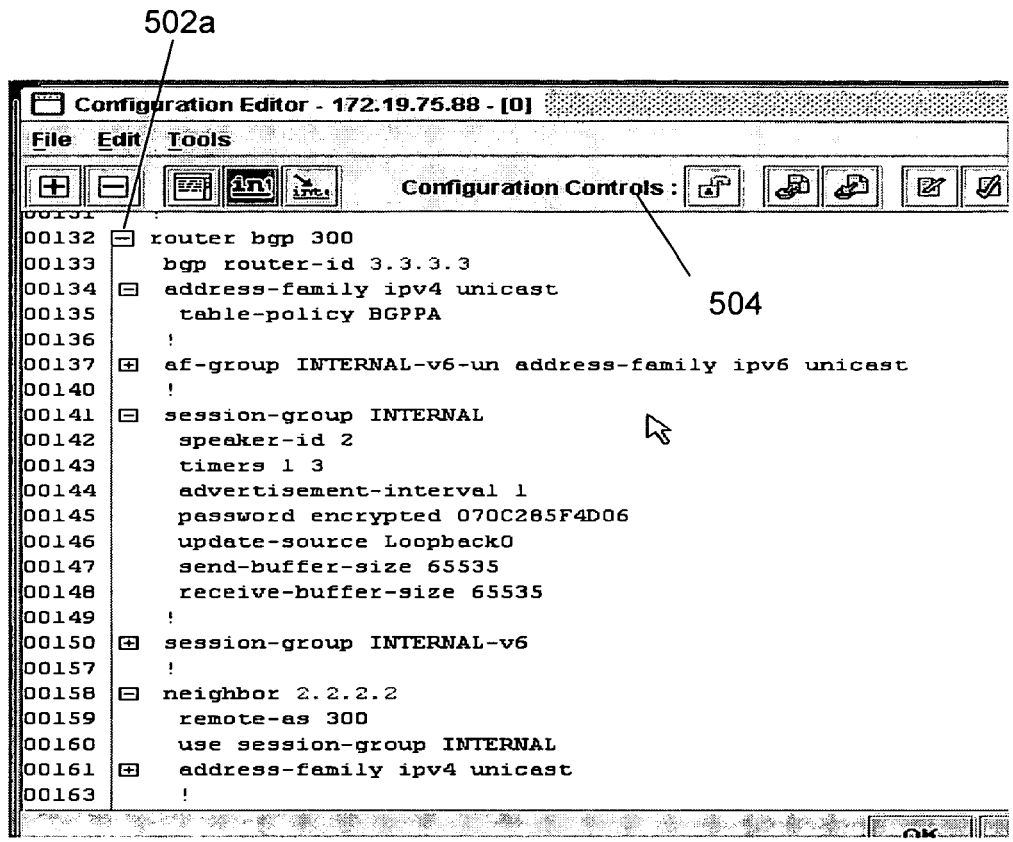
FIGS. 5a and 5b are partial screenshots of a user interface, illustrating an expand-collapse check indicator, in accordance with an embodiment of the invention.
Figure 5B:
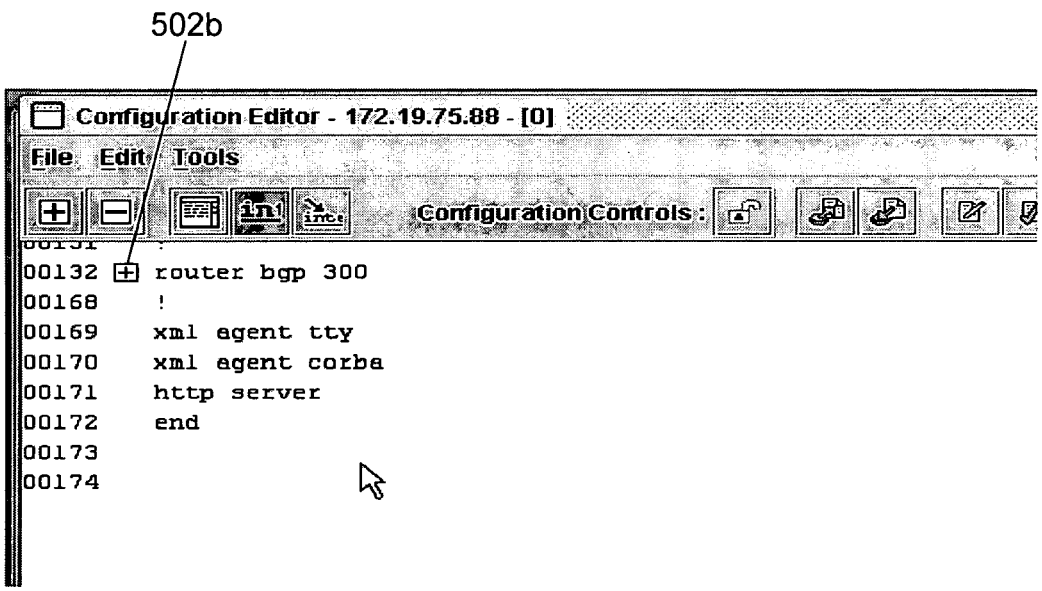

FIGS. 5*a* and 5*b* are two screenshots of user interface 108 illustrating an expand-collapse check indicator 502*a* and 502*b* respectively, in accordance with an embodiment of the invention. In FIG. 5*a*, expand-collapse check indicator 502*a* is displayed. When a user selects expand-collapse check indicator 502*a*, the configuration commands that are lower in hierarchy than the selected level are collapsed and are hidden from the user. The user selects expand-collapse check indicator 502*a* by using a mouse. In an embodiment, expand-collapse check indicator 502*a* is selected by using a keyboard. Conversely, when the user selects expand-collapse check indicator 502*b*, the commands, that were collapsed, are expanded and are made visible to the user.

In another embodiment of the invention (not illustrated), the configuration commands are rendered such that all nested configuration commands are simultaneously either hidden (collapsed) or displayed (expanded) on the user interface, based on the selection of an "all-blocks" expand-collapse check indicator. Preferably, this "all-blocks" expand-collapse indicator is located in the Configuration Controls portion 504 of the tool bar.

Figure 6:
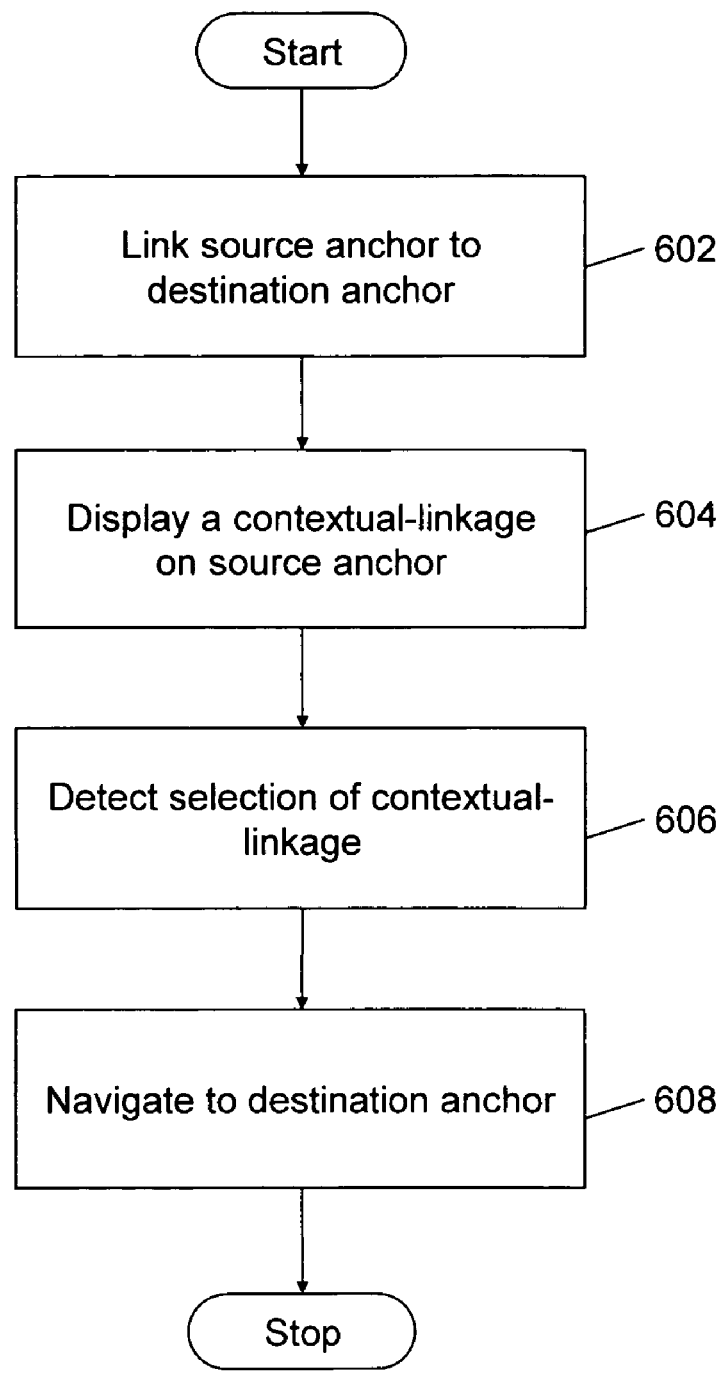
FIG. 6 illustrates a flowchart of a method for dynamically representing configuration commands of a network device on a user interface with the help of a contextual-linkage, in accordance with an embodiment of the present invention.

FIG. 6 illustrates a flowchart of a method for dynamically representing configuration commands of network device 104 on user interface 108 with the help of a contextual-linkage, in accordance with an embodiment of the present invention. Contextual-linkage refers to links that are rendered in the visual representation to show the user when a piece of configuration (referred to as the source anchor) refers to another piece of configuration (referred to as the destination anchor) located elsewhere in the configuration. The contextual links are defined by rules. The rules, which define the pieces of configuration that are related and should be linked, are maintained in a user-editable file. This allows the user to customize the linkages for their specific needs and environment without code changes, and have the rules become dynamically active without reinitializing operation of the application tool 200. The rules defining the linked configuration commands are stored in memory 202.

At 602, rendering editor 206 uses the rules file to link a destination anchor to a source anchor, where source anchor and destination anchor are configuration commands. Once the commands are linked, a user can navigate from the source anchor to the destination anchor without having to search through the configuration. The contextual-linkages are defined separately for each user that may access the configuration on network device 104. Therefore, a user may link commands as per individual requirements. The user defines the contextual-linkage on a user-editable file, which is stored in memory 202. The user can dynamically modify this user-editable file as per his requirements.

Whenever a modification is accepted on the user-editable file or on the configuration, the modification is dynamically parsed by rendering editor 206. Rendering editor 206 dynamically modifies or removes an already existing contextual-linkage, or adds a new contextual-linkage based on accepted modifications to the user-editable rules file or the modifications to the configuration.

At 604, representation module 208 displays a source anchor that has been distinguished to indicate the contextual-linkage. The contextual-linkage may be distinguished from other configuration commands by, for example, highlighting the link or by use of different color. At 606, representation module 208 detects the selection of the contextual-linkage by the user. Subsequently, at 608, representation module 208 navigates to the destination anchor corresponding to the source anchor. To illustrate, if a user wishes to modify the configuration, the present invention allows a user to expand or collapse the hierarchical command structure of the to quickly locate a particular portion of the configuration by collapsing the hierarchical structure to obtain a global view and then to zoom in on the portion of interest by selecting the appropriate expand indicator. Once the user is viewing the portion of configuration, the user may use the simplified navigation between linked sections of the configuration to easily view or modify the configuration.

In another embodiment, memory 202 stores the details of the last selected contextual-linkage. Representation module 208 provides for a provision such as a button, to return to this stored contextual-linkage. Therefore, the user can quickly and easily navigate between the source anchor and the destination anchor across configuration 106.

Figure 7:
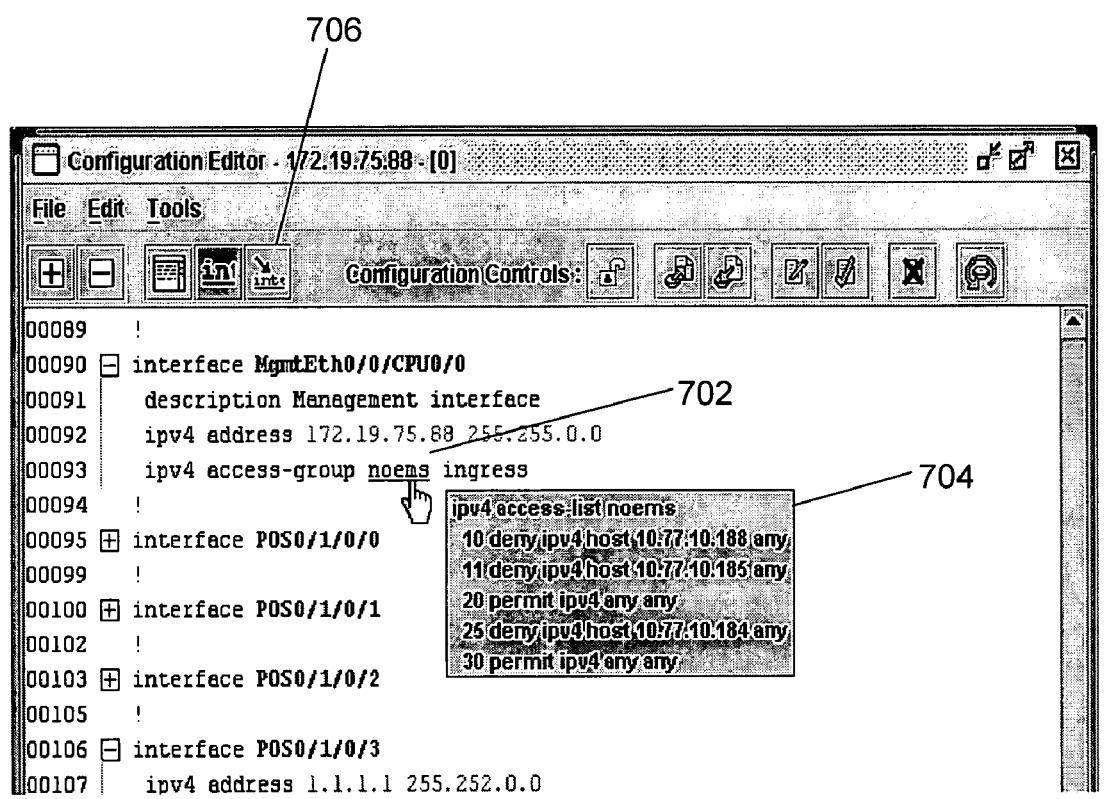
FIG. 7 is a partial screenshot of a user interface illustrating a contextual-linkage, in accordance with an embodiment of the invention.

FIG. 7 is a screenshot of user interface 108 illustrating a contextual-linkage 702, in accordance with an embodiment of the invention. A source anchor 702 is graphically represented as contextual-linked to a destination anchor. When a pointer is detected near source anchor 702, a graphical box, referred to as a tooltip 704, is displayed near the pointer. Tooltip 704 displays a snapshot of the destination anchor where the snapshot includes the entire portion of the configuration associated with the destination anchor. When tooltip 704 is selected by moving the pointer over tooltip 704, representation module 208 navigates to the location of the destination anchor and displays all of the lines of the destination anchor. The user is then shown on their display device the portion of the configuration where the destination anchor is located. The user selects tooltip 704 by using a mouse or other indicating means. In another embodiment, source anchor 702 is selected by using a keyboard.

The details of the source anchor are stored by memory 202. In addition, a return button 706 is provided. When representation module 208 detects the selection of button 706, it returns to the source anchor 702. This enables the user to seamlessly navigate between portions of the configuration where the source anchor and the destination anchor are located. Advantageously, the user need not scroll through the configuration to find related commands.

Adjacent to button 706, an optional button (not illustrated) may be provided in some embodiments such that contextual-linkages can be selectively displayed or not displayed depending on the user's desire.

Figure 8:
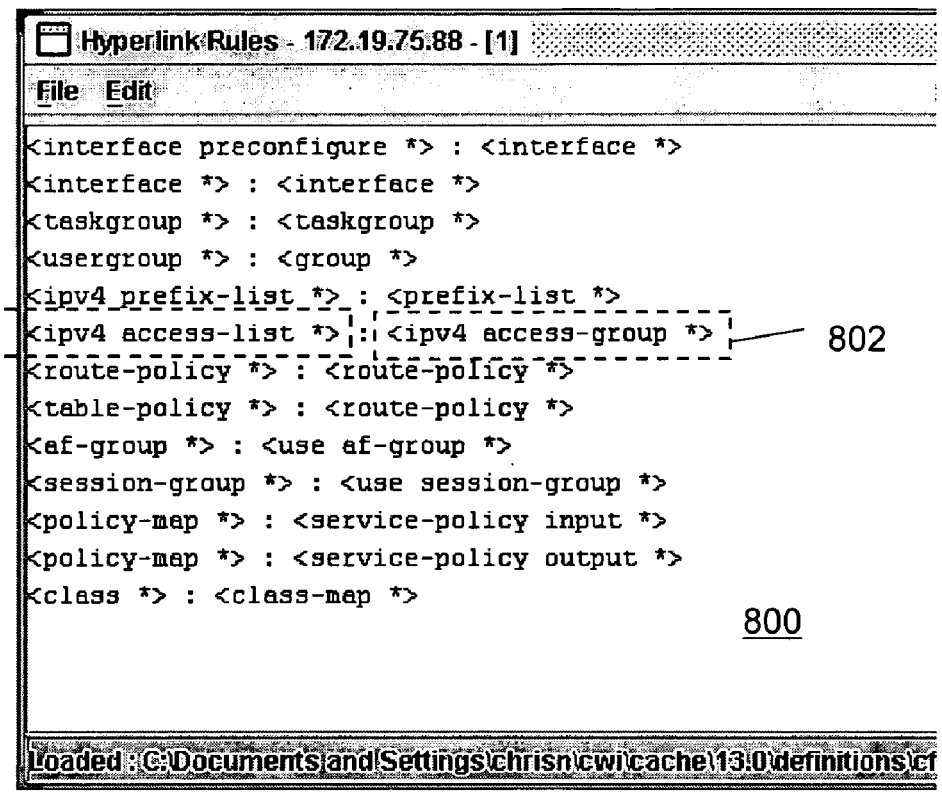
FIG. 8 is a partial screenshot of a user-editable used for defining contextual-linkages, in accordance with an embodiment of the invention.

The rules for which pieces of configuration are related and subject to contextual-linkage are defined in a user-editable file such as illustrated at 800 in FIG. 8, in accordance with an embodiment of the invention. This file allows the user to define and customize the linkages for their specific needs and environment without code changes, and have the linkages dynamically become active without restarting the application tool. More specifically, the user editable contextual-linkage rules file comprises the details of the linked configuration commands that are to be linked in a configuration 106. The user editable-file is preferably stored in computer-readable medium and is associated with a specific configuration 106 and network device 104.

An example of a Contextual-linkage Rules File contents are as follows:

<interface *>: <interface *>

<usergroup *>: <group *>

<ipv4 prefix-list *>: <prefix-list *>

The 'destination anchor' is the line of text that all contextual-linkages will reference. In an embodiment, each contextual-linkage rule entry is preferably in the format: <destination anchor *>: <source anchor *>. It will be appreciated that other formats for contextual-linkage rules are readily envisioned. Such rule formats are, in other embodiments, determined by engineering considerations and are not further discussed herein.

The "*" represents a single word that must be the identical match for the contextual-linkage to be formed. Using the following rule as an example:

<interface *>: <interface *>

Then, any instance of "interface MgmtEth0/0/CPU0/0" is the contextual-linkage for the destination anchor "interface MgmtEth0/0/CPU0/0". However, "interface MgmtEth0/0/CPU0/0" will not be the contextual linkage for the source anchor "interface POS0/1/0/0".

To further illustrate, the user can link a source anchor 802 to a destination anchor 804. Whenever text interface 204 finds source anchor 802, text interface 204 searches configuration 106 for destination anchor 804. If destination anchor 804 is found in configuration 106, source anchor 802 is linked to destination anchor 804. As explained in conjunction with FIG. 7, the contextual-linkage is indicated by visually distinguishing the source anchor 802 to indicate the contextual link to destination anchor 804.

Figure 9:
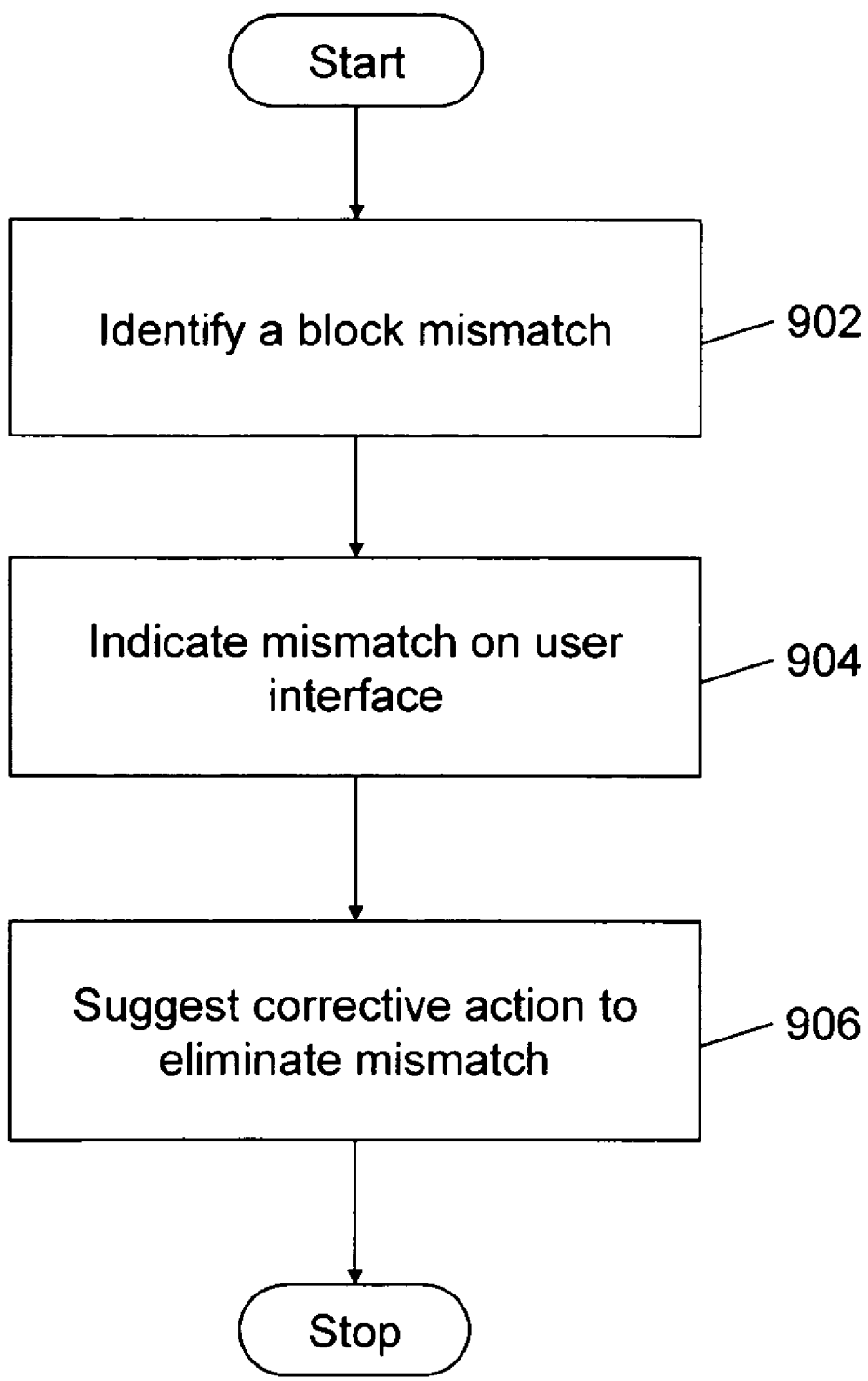
FIG. 9 illustrates a flowchart of a method for dynamically representing configuration commands of a network device on a user interface with the help of mismatch representation in a block, in accordance with an embodiment of the invention.

FIG. 9 illustrates a flowchart of a method for dynamically representing configuration commands of network device 104 on user interface 108 with the help of mismatch representation in a block, in accordance with an embodiment of the invention. A block is defined as a set of configuration commands that begins with a starting configuration command and terminates with an ending configuration command. The configuration commands present between the starting configuration command and the ending configuration command are referred to as the body configuration commands. The details of the various blocks are present in the data model.

At 902, rendering editor 206 identifies a mismatch in the block. The mismatch may be detected by the absence of a corresponding ending configuration command for a starting configuration command or vice versa. Indentation of the configuration commands following the starting configuration command may be compared to identify this mismatch. If another starting configuration command is detected before an ending configuration command, then a mismatch is declared. Furthermore, these mismatches are identified in real-time. Therefore, whenever a modification to a configuration command is accepted, rendering editor 206 searches for a mismatch.

At 904, representation module 208 indicates the mismatch on user interface 108. Highlighting is preferably used to indicate the mismatch. As mentioned earlier, the identification of the mismatch is performed in real-time. Therefore, if a mismatch is identified, it is dynamically represented by representation module 208. At 906, rendering editor 206 may suggest corrective action to eliminate detected mismatches by, for example, suggesting placement for an ending configuration command.

Figure 10:
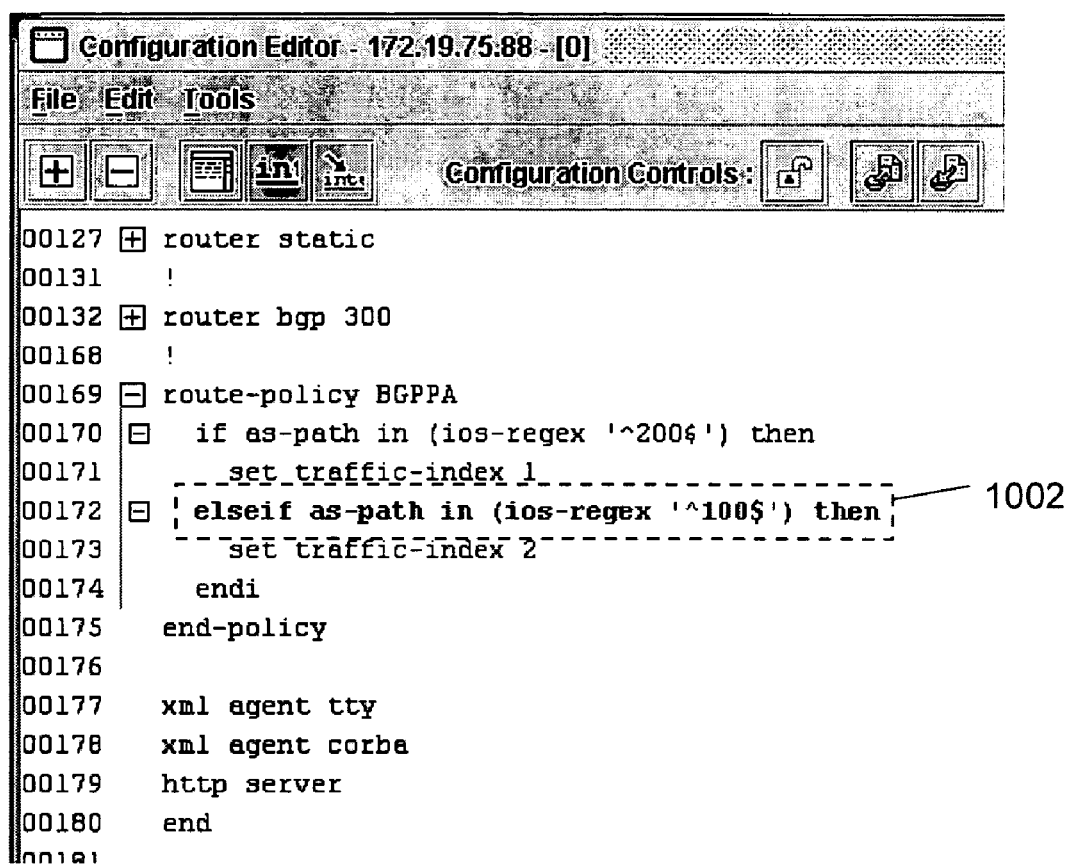
FIG. 10 is a partial screenshot illustrating a block mismatch, in accordance with an embodiment of the invention.

FIG. 10 is a screenshot illustrating a block mismatch, in accordance with an embodiment of the invention. An 'elseif' command 1002 is a starting configuration command. The corresponding ending configuration command is defined as 'endif'. When an 'endif' command is not encountered by the rendering editor 206, representation module 208 highlights 'elseif' command 1002. Furthermore, as the identification of a mismatch is carried out dynamically, when an 'endif' command is accepted on user-interface 108 corresponding to 'elseif' command 1002, the mismatch is no longer indicated.

Various embodiments of the invention provide a method for dynamically representing configuration commands of a network device on a user interface using an application tool. The method comprising: storing a data model, wherein the data model represents the configuration commands; rendering the configuration commands on the data model; and representing the rendered data model on the user interface.

According to another embodiment of the invention, an application tool configured for dynamically representing configuration commands of a network device on a user interface is provided. The application tool comprising: a storing module for storing a data model, wherein the data model represents the configuration commands; a rendering editor for rendering the data model; and a representation module for representing the rendered data model on the user interface.

According to still another embodiment of the invention, an apparatus for dynamically representing configuration commands of a network device on a user interface is provided. The apparatus comprising: a processing system including a processor coupled to a display and user input device; and a machine-readable medium including instructions executable by the processor. The instructions comprising means for storing a data model, wherein the data model represents the configuration commands; means for rendering the configuration commands on the data model; and means for representing the rendered data model on the user interface.

Embodiments of the invention provide a method and an application tool for dynamically representing configuration commands of a network device on a user interface. Embodiments of the invention provide simplified viewing of the configuration by dynamic expanding and collapsing the configuration commands. In addition, embodiments of the invention provide dynamic linking of two configuration commands. This facilitates simplified viewing and navigation between the configuration commands. Additionally, embodiments of the invention assist in debugging of errors by dynamically indicating mismatches in blocks of configuration commands.

In the discussions of the invention discussed with respect to the various embodiments refer to network device; however one skilled in the art will appreciate that the system and methods described herein are also applicable to network appliances, servers or clients.

Although the invention has been discussed with respect to specific embodiments thereof, these embodiments are merely illustrative, and not restrictive, of the invention.

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the invention.

Reference throughout this specification to "one embodiment", "an embodiment", or "a specific embodiment" means that a particular feature, structure, or characteristic described in connection with the embodiment is included in at least one embodiment of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention, described and illustrated herein, are possible in light of the teachings herein and are to be considered as part of the spirit and scope of the present invention.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or executable code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

Embodiments of the invention may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of the present invention can be achieved by any means as is known in the art. Distributed, or networked systems, components and circuits can be used. Communication, or transfer, of data may be wired, wireless, or by any other means.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for dynamically representing a configuration of a network device on a user interface, the method comprising:

storing a data model, wherein the data model represents a plurality of configuration command lines for the configuration of the network device, the plurality of configuration command lines being organized in configuration command blocks;

detecting that an expand-collapse indicator has been selected for at least one of the configuration command blocks and controlling the representation of the configuration command lines in a hierarchical structure, wherein a selected expand indicator for the at least one configuration command block allows viewing of each configuration command line therein on the user interface, and wherein a selected collapse indicator for the at least one configuration command block allows hiding of each configuration command line therein on the user interface while maintaining each of the hidden configuration commands in the data model;

defining contextual-linkage rules between at least two of the configuration command blocks for the network device using the text editor on the user interface, the defined contextual-linkage rules being stored in a user-editable file that is separate from the data model such that the user editable file containing the defined contextual-linkage rules is specific to a user and persistent for subsequent accesses by the user without changing the data model, wherein the defined contextual-linkage rules allow navigation directly between the at least two of the configuration command blocks on the user interface by designation of source and destination anchors from among the at least two configuration command blocks;

rendering the configuration of the network device by parsing each configuration command, expand-collapse check indicator, and defined contextual-linkage rules from the user-editable file on the data model to provide a dynamically customized view of the configuration of the network device, wherein the dynamically customized view of the configuration of the network device is directly navigable from the source anchor to the destination anchor on the user interface; and visually representing in textual form, the rendered configuration on a window of the user interface for navigation of the configuration of the network device from the data model, wherein detection of a pointer over the source anchor in the visual representation produces a snapshot display of all lines of the destination anchor on the user interface proximate to the source anchor.

2. The method of claim 1, further comprising changing the configuration of the network device using the visual representation of the rendered configuration in the textual form.

3. The method of claim 1, further comprising using the data model to allow dynamic navigation of the configuration of the network device using the visual representation of the rendered configuration.

4. The method of claim 1, wherein the rendering the configuration of the network device further comprises linking the source anchor to the destination anchor.

5. The method of claim 4, wherein the linking further comprises parsing the defined contextual-linkage rules to link the source anchor and the destination anchor.

6. The method of claim 5, further comprising dynamically displaying contextual-linkage of configuration command blocks based on the defined contextual-linkage rules and at least one modification to the defined contextual-linkage rules.

7. The method of claim 6, wherein the dynamically displaying further comprises:
accepting a modification to the configuration of the network device from the user interface; and
dynamically designating portions of the modified configuration that matches one of the defined contextual-linkage rules to indicate the contextual-linkage of configuration command blocks.

8. The method of claim 4, further comprising:
displaying the source anchor;
detecting a selected source anchor; and
navigating to the destination anchor linked to the selected source anchor.

9. The method of claim 8, further comprising:
detecting a pointer positioned proximate to one of the defined contextual-linkage rules; and
displaying a snapshot of the destination anchor on the user interface.

10. The method of claim 1, wherein the user-editable file and the data model are stored in a memory on a management station.

11. The method of claim 1, wherein the rendering comprises:
identifying data hierarchy in the data model, the data hierarchy comprising a plurality of levels;
displaying an expand-collapse check indicator at each level in the hierarchy, wherein the expand-collapse check indicator is used for controlling a representation of the data hierarchy; and
detecting a selection of the expand-collapse check indicator.

12. The method of claim 11, further comprising using the expand-collapse check indicator and the data model to navigate the configuration of the network device.

13. The method of claim 11, wherein the rendering further comprises:
identifying a mismatch in a configuration command block, the configuration command block comprising a starting configuration command, an ending configuration command, and one or more body configuration commands; and
indicating the identified mismatch on the user interface.

14. The method of claim 1, wherein the rendering further comprises:
identifying a mismatch in a configuration command block, the configuration command block comprising a starting configuration command, an ending configuration command, and one or more body configuration commands; and
indicating the identified mismatch on the user interface.

15. The method of claim 14, further comprising:
accepting a modification to the configuration command block; and
indicating the identified mismatch for the modified configuration command block, wherein the mismatch is dynamically indicated on the user interface when the modification is accepted.

16. An apparatus for dynamically representing a configuration of a network device, the apparatus comprising: a processor; and logic encoded in one or more tangible media for execution by the processor, and when executed operable to:
store a data model, wherein the data model represents a plurality of configuration command lines for the configuration of the network device, the plurality of configuration command lines being organized in configuration command blocks;

detect that an expand-collapse indicator has been selected for at least one of the configuration command blocks and control the representation of the configuration command lines in a hierarchical structure, wherein a selected expand indicator for the at least one configuration command block allows viewing of each configuration command line therein on the user interface, and wherein a selected collapse indicator for the at least one configuration command block allows hiding of each configuration command line therein on the user interface while maintaining each of the hidden configuration commands in the data model;

define contextual-linkage rules between at least two of the configuration command blocks for the network device using the text editor on the user interface, the defined contextual-linkage rules being stored in a user-editable file that is separate from the data model such that the user editable file containing the defined contextual-linkage rules is specific to a user and persistent for subsequent accesses by the user without changing the data model, wherein the defined contextual-linkage rules allow navigation directly between the at least two of the configuration command blocks on the user interface by designation of source and destination anchors from among the at least two configuration command blocks;

render the configuration of the network device by parsing each configuration command, expand-collapse check indicator, and defined contextual-linkage rules from the user-editable file on the data model to provide a dynamically customized view of the configuration of the network device, wherein the dynamically customized view of the configuration of the network device is directly navigable from the source anchor to the destination anchor on the user interface; and visually represent in textual form the rendered configuration on a window of the user interface for navigation of the configuration of the network device from the data model: wherein detection of a pointer over the source anchor in the visual representation produces a snapshot display of all lines of the destination anchor on the user interface proximate to the source anchor.

17. The apparatus of claim 16, wherein the contextual-linkage rules comprise identification of the source anchor and the destination anchor by separating the source anchor from the destination anchor by a colon on one line of text using the text editor.

18. The apparatus of claim 17, wherein the source anchor comprises a visually distinctive representation in a first display mode and a non-distinctive representation in a second display mode.

19. The apparatus of claim 18, further comprising:
a pointer for selecting contextual-linkage in the first display mode; and
means for displaying a snapshot of the destination anchor on the user interface.

20. The apparatus of claim 16, wherein the logic when executed is further operable to use the data model to allow dynamic navigation of the configuration of the network device via the visual representation of the rendered configuration.

21. The apparatus of claim 16, wherein the logic when executed is further operable to identify a data hierarchy in the data model.

22. The apparatus of claim 21, wherein the logic when executed is further operable to identify a mismatch in a portion of the configuration of the network device.

23. The apparatus of claim 16, wherein the user-editable file and the data model are stored in a memory on a management station.

24. An apparatus for dynamically navigating a network device configuration, the apparatus comprising:
a processor; means for storing a data model in a memory coupled to the processor, wherein the data model represents a plurality of configuration commands for the configuration of the network device, the plurality of configuration commands being organized in configuration command blocks;
means for detecting that an expand-collapse indicator has been selected for at least one of the configuration command blocks and controlling the representation of the configuration command lines in a hierarchical structure, wherein a selected expand indicator for the at least one configuration command block allows viewing of each configuration command line therein on the user interface, and wherein a selected collapse indicator for the at least one configuration command block allows hiding of each configuration command line therein on the user interface while maintaining each of the hidden configuration commands in the data model;
means for defining contextual-linkage rules between at least two of the configuration command blocks for the network device using the text editor on the user interface, the defined contextual-linkage rules being stored in a user-editable file that is separate from the data model such that the user editable file containing the defined contextual-linkage rules is specific to a user and persistent for subsequent accesses by the user without changing the data model, wherein the defined contextual-linkage rules allow navigation directly between the at least two of the configuration command blocks on the user interface by designation of source and destination anchors from among the at least two configuration command blocks;
means for rendering the configuration of the network device by parsing each configuration command, expand-collapse check indicator, and defined contextual-linkage rules from the user-editable file on the data model to provide a dynamically customized view of the configuration of the network device, wherein the dynamically customized view of the configuration of the network device is directly navigable from the source anchor to the destination anchor on the user interface; and
means for visually representing in textual form, the rendered configuration on window of the user interface for navigation of the configuration of the network device from the data model: wherein
detection of a pointer over the source anchor in the visual representation produces a snapshot display of all lines of the destination anchor on the user interface proximate to the source anchor.

25. The apparatus of claim 24, further comprising:
means for providing persistent, user customized, rules for dynamically changing the visual representation of the configuration of the network device when displayed on the user interface.

26. The apparatus of claim 25, further comprising:
means for editing the configuration of the network device; and
means for identifying incomplete and inconsistent sections while editing the configuration of the network device.

\* \* \* \* \*